UNITED STATES PATENT OFFICE.

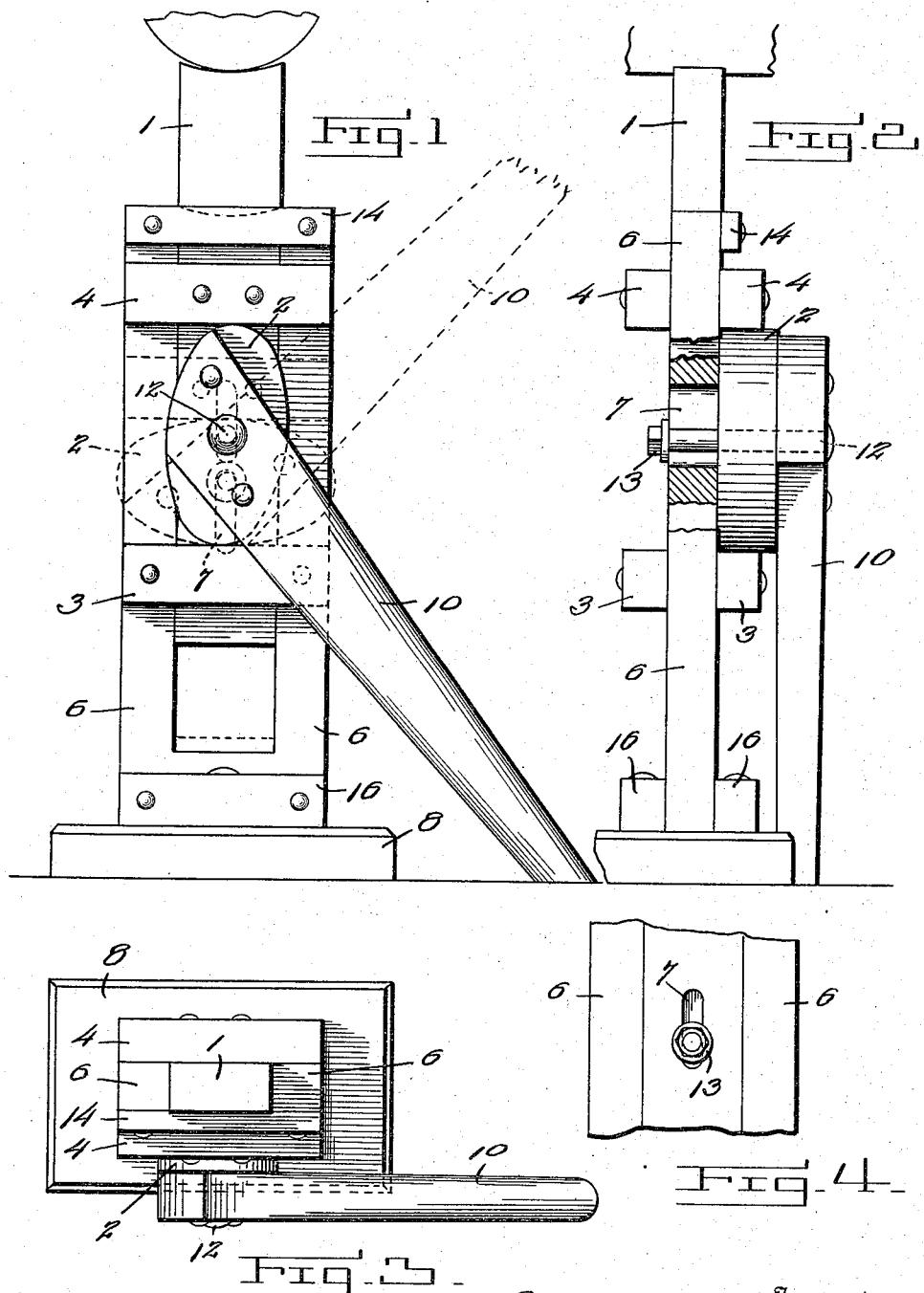

EDWARD A. WENGLER, OF GLASGOW, MISSOURI.

LIFTING-JACK.

1,166,729.  Specification of Letters Patent.  Patented Jan. 4, 1916.

Application filed June 3, 1915. Serial No. 31,866.

*To all whom it may concern:*

Be it known that I, EDWARD A. WENGLER, a citizen of the United States, residing at Glasgow, in the county of Howard and State of Missouri, have invented certain new and useful Improvements in Lifting-Jacks, of which the following is a specification.

This invention relates to certain improvements in lifting jacks, and more particularly to lifting jacks which are adapted for use in lifting automobiles, and other vehicles.

One of the objects of the invention is to produce a lifting jack which is so constructed that four of these jacks may be placed under the axles of a motor vehicle, one near each wheel, and by a minimum amount of labor applied by a lever to each jack the vehicle may be raised from the floor and suspended upon the jacks, thereby relieving the tires from the weight of the vehicle.

Having in view this, and other important objects, such as simplifying the construction of the jack, and providing means for raising the jack, either by depressing the operating lever by the foot, or by raising said lever, my invention consists in the construction and combination of devices which will be hereinafter more fully described, and claimed.

In the accompanying drawings, which illustrate a preferred embodiment of the invention: Figure 1 is a side elevation; Fig. 2 is a front elevation, partly in section, of the jack shown in Fig. 1; Fig 3 is a plan view, and Fig. 4 is a detail view.

The jack herein illustrated comprises a frame which is preferably composed of uprights 6, 6, suitably spaced apart, and sustained by a base 8. The uprights 6, 6, as herein shown, are secured together at their upper ends by a transverse strip 14, which is secured by screws, bolts, or other suitable means to the upper end portions of the uprights. Transverse strips 16, 16, are secured to the base 8 upon opposite sides of the uprights 6, 6, and strips 3, 3, are bolted, or otherwise suitably fastened to the uprights 6, 6, upon opposite sides thereof, and to each other, as clearly shown in Figs. 1 and 2.

The elements described, namely, the uprights 6, 6, the base 8, and the bracing strips 16, 16, 3, 3, and 14, constitute a rigid frame for supporting and guiding the movable member, or lifting bar 1, of the jack. The lifting bar 1 moves between the uprights 6, 6, and is guided in the space between these bars, and between the strips 3, 3. The bar 1 is also guided in part by two strips 4, 4, which are rigidly secured to the opposite faces of the bar, and lie on opposite sides of the uprights 6, 6, so that these strips rise and fall with the lifting bar. The lifting element of the jack is a cam 2, which is elliptical in shape, and is rigidly secured to a lever 10 by a pin 12, which passes centrally through the cam, and also through an aperture located near one end of the lever 10. The pin 12 is extended beyond the inner face of the cam 2, and passes through a vertical slot 7 formed in the bar 1, and is provided at its end with a washer, and nut 13, which serve to retain the cam and lever in operative positions relatively to the bar 1. The cam 2 engages one of the strips 4, and rests upon the strip 3 connected with the frame, as shown.

The bar 1, which is inserted beneath the axle of a vehicle, or other object to be lifted, may be made of any desired length of projection at its upper end, beyond the strip 14, according to the height of the axle of the vehicle from the ground.

In the use of the device, the cam 2 will occupy the position shown by dotted lines in Fig. 1 when the lifting bar 1 of the jack is in its lowermost position. By inserting the upper end of the bar beneath the axle of a vehicle, or other object to be lifted, and pressing with the foot upon the lever 10 the cam 2 will move from its position as shown in dotted lines, with its major axis horizontal, to the position shown in full lines where its major axis is vertical, and in so doing the cam will, through its action upon the strip 4, lift the bar 1 and the object resting thereupon. During this operation the bar 1 will rise more rapidly than the pin 12, which is compensated by the slot 7, and the pin 12 thereby acts as a floating pivot.

When the lifting bar 1 is in elevated position, as shown in Fig. 1, it will be seen that the cam 2 has been moved slightly beyond its "dead point," so that the center of gravity of the object lifted, assuming that it is substantially coincident with the vertical center of the bar 1, will fall slightly to the left of the major axis of the cam, thus exerting a slight pressure upon the lever 10 to hold it in lowered position. To lower the jack from this position, the handle 10 is grasped and raised upwardly into the position shown by dotted lines in Fig. 1, the strip 4 then resting upon the longer side of the cam 2, as shown. When the lifting bar 1 is in lowered position the shape of the cam 2 permits the bar to be raised, either by a downward pressure upon the lever 10 applied by the operator's foot, or by an upward pull upon said lever applied by the hand. If the latter mode of lifting the bar be adopted it will be obvious that the lever 10 will be swung from the position indicated by dotted lines in Fig. 1 to an upwardly inclined position upon the opposite side of the jack.

It will thus be seen that this jack is capable of operation by a minimum of expenditure of force on the part of the operator, and that when in lowered position it may be raised by a movement of the operating lever in either of two directions, to suit the convenience of the operator.

This jack is particularly useful for lifting the tires of motor cars from the floor of a garage, for by placing one of the jacks under the axle near each wheel the car may be raised and the tires relieved from the weight thereof.

Changes may be made in the form, construction, or arrangement of the several parts herein shown and described without departing from the scope of the invention as set forth in the following claims.

Having thus described my invention what I claim as new and desire to secure by Letters Patent of the United States is:

1. A lifting jack comprising a frame, a lifting bar guided for movements therein and having a lateral projection, a cam arranged to act on the bar through said projection and supported at its lower edge upon a rigid projection from the frame, a floating pivot connecting said cam and bar and means for operating said cam to raise the bar.

2. A lifting jack comprising a frame, a track rigidly supported thereon, a lifting bar guided for movements in said frame and having a lateral projection, an oval cam supported by said track and acting upon said projection to raise the lifting bar, a pin carried by said cam and projecting through a slot in said bar, and operating means for the cam.

3. A lifting jack comprising a frame provided with a lateral projection forming a track, an oval cam sustained by said track and having an operating handle, a lifting bar guided in the frame, a lateral strip carried by the bar and resting upon said cam, and a floating pivot connecting the cam and bar, said cam being adapted to raise the bar by movement of its handle either in an upward or a downward direction.

4. A lifting jack having, in combination, a frame comprising two spaced uprights connected by a transverse strip having a plane upper face, an oval cam resting on said face, a lifting bar guided in the space between said uprights and having two parallel, transverse strips movable upon the opposite faces of said uprights, one of said strips resting upon said cam, an operating handle, a pin securing said cam and handle together and extended to pass through a slot in said bar, and retaining means to secure the pin to the bar, said pin constituting a floating pivot for the cam.

EDWARD A. WENGLER.

Witnesses:
U. P. HALL,
W. B. NIVERT-MAYOR.

Copies of this patent may be obtained for five cents each, by addressing the "Commissioner of Patents, Washington D. C."